United States Patent
Schwartzman

(10) Patent No.: US 9,882,669 B1
(45) Date of Patent: Jan. 30, 2018

(54) ACTIVATING INTERFERENCE SIGNAL REJECTION FILTER PATH BASED ON DETECTION OF AN INTERFERENCE SIGNAL IN A WIRELESS DISTRIBUTION SYSTEM (WDS)

(71) Applicant: Corning Optical Communications Wireless Ltd, Airport City (IL)

(72) Inventor: Ronen Schwartzman, Rehovot (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/473,802

(22) Filed: Mar. 30, 2017

Related U.S. Application Data

(63) Continuation of application No. 15/208,804, filed on Jul. 13, 2016.

(51) Int. Cl.
  *H04B 1/06* (2006.01)
  *H04J 11/00* (2006.01)
  (Continued)

(52) U.S. Cl.
  CPC ............ *H04J 11/0023* (2013.01); *H04B 7/04* (2013.01); *H04L 43/028* (2013.01); *H04L 43/16* (2013.01);
  (Continued)

(58) Field of Classification Search
  CPC ... H04W 88/06; H04W 72/082; H04W 84/12; H04W 24/08; H04W 72/0453;
  (Continued)

(56) References Cited

U.S. PATENT DOCUMENTS

| 9,281,975 B1 | 3/2016 | Saig |
| 2005/0059400 A1* | 3/2005 | Jagadeesan ........... H04W 36/30 455/436 |

(Continued)

OTHER PUBLICATIONS

International Search Report and Written Opinion PCT/IL2017/050785 dated Dec. 11, 2017.

(Continued)

*Primary Examiner* — Tu X Nguyen
(74) *Attorney, Agent, or Firm* — C. Keith Montgomery

(57) ABSTRACT

Embodiments of the disclosure relate to activating an interference signal rejection filter path based on detection of an interference signal in a wireless distribution system (WDS). In this regard, in one aspect, a filter path selection circuit is configured to activate an interference rejection filter path configured to suppress a predefined interference signal when the predefined interference signal is detected in a received radio frequency (RF) signal. In another aspect, the filter path selection circuit is configured to detect the predefined interference signal by comparing a measured power level of the predefined interference signal against a predefined power threshold. By activating the interference rejection filter path to suppress the predefined interference signal based on detection of the predefined interference signal, it is possible to dynamically respond to the predefined interference signal that may randomly appear in the WDS, thus providing an enhanced overall RF performance in the WDS.

17 Claims, 11 Drawing Sheets

(51) Int. Cl.
*H04L 12/26* (2006.01)
*H04B 7/04* (2017.01)
*H04W 72/04* (2009.01)

(52) U.S. Cl.
CPC ..... *H04W 72/042* (2013.01); *H04W 72/0413* (2013.01)

(58) Field of Classification Search
CPC ..... H04W 24/10; H04W 52/52; H04W 88/02; H04W 40/22; H04W 48/16; H04W 52/0229; H04W 64/00
USPC .......... 455/554.1, 13.1, 41.2, 436, 439, 134, 455/277.1
See application file for complete search history.

(56) References Cited

U.S. PATENT DOCUMENTS

| | | |
|---|---|---|
| 2005/0266808 A1 | 12/2005 | Reunakaki et al. |
| 2007/0142013 A1 | 6/2007 | Bucknor et al. |
| 2008/0057897 A1 | 3/2008 | Magnusen et al. |
| 2009/0280757 A1 | 11/2009 | Zhu et al. |
| 2010/0321110 A1 | 12/2010 | Ichitsubo et al. |
| 2013/0201882 A1 | 8/2013 | Bauder et al. |
| 2013/0324113 A1* | 12/2013 | Jechoux ................ H04W 88/06 455/426.1 |
| 2014/0361839 A1 | 12/2014 | Scott et al. |

OTHER PUBLICATIONS

International Searching Authority Invitation to Pay Additional Fees and Partial Search Report PCT/IL2017/050786 dated Oct. 16, 2017.

* cited by examiner

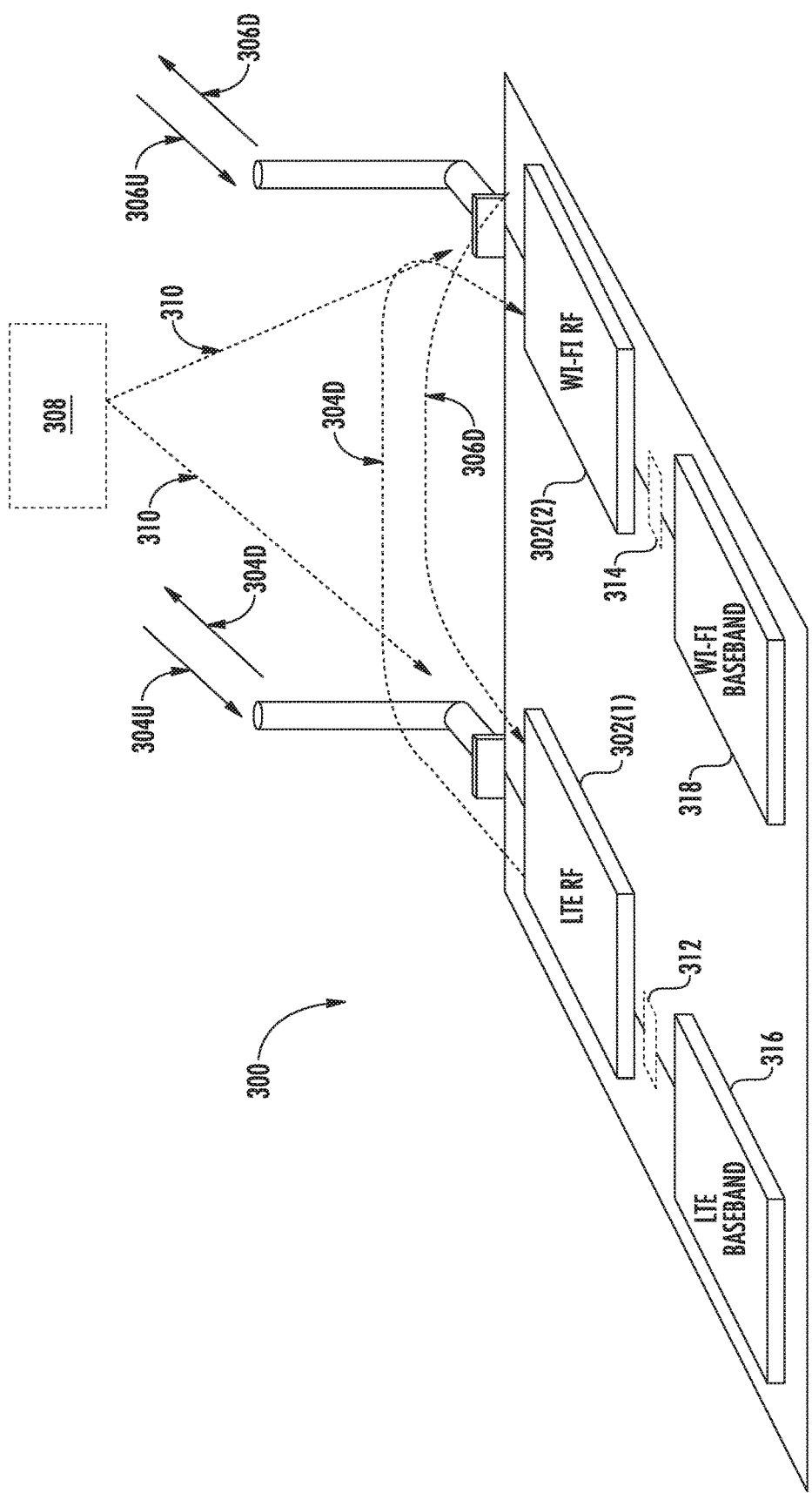

ACTIVATING INTERFERENCE SIGNAL REJECTION FILTER PATH BASED ON DETECTION OF AN INTERFERENCE SIGNAL IN A WIRELESS DISTRIBUTION SYSTEM (WDS)

RELATED APPLICATION

This application is a continuation of U.S. application Ser. No. 15/208,804, filed on Jul. 13, 2016, the content of which is relied upon and incorporated herein by reference in its entirety, and the benefit of priority under 35 U.S.C. § 120 is claimed.

BACKGROUND

The disclosure relates generally to reducing interference(s) in a wireless distribution system (WDS), such as a distributed antenna system (DAS) and, more particularly, to activating interference signal rejection filter path based on detection of an interference signal in the WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of distributed antenna systems (DASs). DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a WDS provided in the form of a DAS 102, wherein 'N' is the number of remote coverage areas. These communications services can include cellular services (e.g., long-term evolution (LTE)), local area wireless services, such as RF identification (RFID) tracking, Bluetooth, and wireless local area network (e.g., Wi-Fi), and global positioning system (GPS) signal-based wireless solutions for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N). With reference to FIG. 1, the remote units 104(1)-104(N) may be configured to provide both the cellular services and the local area network services in adjacent RF spectrums. In this regard, FIG. 2 is a schematic diagram of an exemplary RF spectrum map 200 that includes RF bands for providing cellular and local area network services in the WDS 102 of FIG. 1. With reference to FIG. 2, the local area network services (e.g., Bluetooth and Wi-Fi) may be provided over a two point four gigahertz (2.4 GHz) industrial, scientific, and medical (ISM) band 202. As such, the Wi-Fi services are configured to operate between 2401 MHz and 2495 MHz of the ISM band 202. In a non-limiting example, the Wi-Fi spectrum includes fourteen (14) Wi-Fi channels (Ch1-Ch14). Among the 14 Wi-Fi channels, Ch1 lies between 2401 MHz and 2423 MHz, and Ch14 lies between 2473 MHz and 2495 MHz. The 2.4 GHz ISM band 202 may also be configured to support the Bluetooth services based on seventy nine (79) channels ranging 2402 MHz to 2480 MHz of the ISM band 202.

With continuing reference to FIG. 2, the LTE services, when configured according to a time-division duplex (TDD) mode, may be provided in a first LTE TDD band 204 and/or a second LTE TDD band 206. The first LTE TDD band 204, which is commonly referred to as LTE band forty (40), has a lower boundary 208 located at two thousand three hundred megahertz (2300 MHz) and an upper boundary 210 located at 2400 MHz. The second LTE TDD band 206, which is commonly referred to as LTE band forty one (41), has a lower boundary 212 located at two thousand four hundred ninety six megahertz (2496 MHz) and an upper boundary 214 located at two thousand six hundred ninety megahertz (2690 MHz).

As illustrated in FIG. 2, the upper boundary 210 of the LTE band 40 (2400 MHz) is merely separated from the Wi-Fi Ch1 (2401 MHz) by one (1) megahertz (1 MHz). Likewise, the lower boundary 212 of the LTE band 41 (2496 MHz) is merely separated from the Wi-Fi Ch14 (2495 MHz) by 1 MHz. As such, when the remote units 104(1)-104(N) of FIG. 1 are configured to concurrently provide LTE services in LTE band 41 and Wi-Fi services in the Wi-Fi Ch14 for example, RF interferences may occur between the LTE services and the Wi-Fi services due to insufficient spectrum separation between the LTE band 41 and the Wi-Fi Ch14. In this regard, it may be desired to provide additional spectrum protection in the remote units 104(1)-104(N) to optimize RF performance of the WDS 102.

No admission is made that any reference cited herein constitutes prior art. Applicant expressly reserves the right to challenge the accuracy and pertinency of any cited documents.

SUMMARY

Embodiments of the disclosure relate to activating an interference signal rejection filter path based on detection of an interference signal in a wireless distribution system (WDS). For example, the WDS may be a distributed antenna system (DAS) configured to distribute radio-frequency (RF) signals over a communications medium to a plurality of remote units. The WDS may be configured to concurrently receive and transmit RF signals in adjacent frequency bands having limited spectrum separation. As such, an interference rejection filter(s) is often employed to reduce interference(s) that may occur between the concurrently received and transmitted RF signals. However, the interference rejection filter(s) employed to reduce interference(s) can potentially degrade the received RF signals. In this regard, in one aspect disclosed herein, a filter path selection circuit is provided in the WDS to opportunistically activate the interference rejection filter(s) when interference(s) is present. The filter path selection circuit is configured to activate an interference rejection filter path configured to suppress a predefined interference signal when the predefined interference signal is detected in a received RF signal. The filter path selection circuit is further configured to activate a pass filter path to allow the received RF signal to pass when the predefined interference signal is not detected in the received RF signal. In this manner, it is possible to dynamically respond to the predefined interference signal to avoid unnecessary degradation to the received RF signal, thus providing an enhanced overall RF performance in the WDS. Further, in another aspect, the filter path selection circuit is configured to detect the predefined interference signal by comparing a measured power level of the predefined interference signal against a predefined power threshold. As such, it is possible to configure the filter path selection circuit to respond to different power levels of the interference(s), thus enabling more flexible detection of the interference(s).

One embodiment of the disclosure relates to a filter path selection circuit in a WDS. The filter path selection circuit comprises an interference rejection filter path comprising a first RF filter. The first RF filter is configured to receive an RF signal from a first filter path input provided in the interference rejection filter path and communicatively coupled to one or more client devices in the WDS. The first RF filter is also configured to filter the received RF signal at a first rejection level to generate a first filter path output signal. The filter path selection circuit also comprises a pass filter path comprising a second RF filter. The second RF filter is configured to receive the RF signal from a second filter path input provided in the pass filter path and communicatively coupled to the one or more client devices in the WDS. The second RF filter is also configured to filter the received RF signal at a second rejection level lower than the first rejection level to generate a second filter path output signal. The filter path selection circuit also comprises a controller. The controller is configured to determine whether the RF signal comprises a predefined interference signal based on a measured power level of the predefined interference signal. The controller is also configured to couple the RF signal to the first filter path input of the interference rejection filter path if the measured power level of the predefined interference signal is higher than a predefined power threshold. The controller is also configured to couple the RF signal to the second filter path input of the pass filter path if the measured power level of the predefined interference signal is lower than or equal to the predefined power threshold.

Another embodiment of the disclosure relates to a method for selecting a filter path based on determined presence or absence of a predefined interference signal in a WDS. The method comprises receiving an RF signal. The method also comprises determining whether the RF signal comprises the predefined interference signal based on a measured power level of the predefined interference signal. The method also comprises coupling the RF signal to a first filter path input of an interference rejection filter path if the measured power level of the predefined interference signal is higher than a predefined power threshold. The interference rejection filter path comprises a first RF filter configured to filter the received RF signal at a first rejection level to generate a first filter path output signal. The method also comprises coupling the RF signal to a second filter path input of a pass filter path if the measured power level of the predefined interference signal is lower than or equal to the predefined power threshold. The pass filter path comprises a second RF filter configured to filter the received RF signal at a second rejection level lower than the first rejection level to generate a second filter path output signal.

Another embodiment of the disclosure relates to a filter path selection system in a WDS. The filter path selection system comprises a filter path selection circuit. The filter path selection circuit comprises an interference rejection filter path comprising a first RF filter. The first RF filter is configured to receive an RF signal from a first filter path input provided in the interference rejection filter path and communicatively coupled to one or more client devices in the WDS. The first RF filter is also configured to filter the received RF signal at a first rejection level to generate a first filter path output signal. The filter path selection circuit also comprises a pass filter path comprising a second RF filter. The second RF filter is configured to receive the RF signal from a second filter path input provided in the pass filter path and communicatively coupled to the one or more client devices in the WDS. The second RF filter is also configured to filter the received RF signal at a second rejection level lower than the first rejection level to generate a second filter path output signal. The filter path selection circuit also comprises a controller. The controller is configured to determine whether the RF signal comprises a predefined interference signal based on a measured power level of the predefined interference signal. The controller is also configured to couple the RF signal to the first filter path input of the interference rejection filter path if the measured power level of the predefined interference signal is higher than a predefined power threshold. The controller is also configured to couple the RF signal to the second filter path input of the pass filter path if the measured power level of the predefined interference signal is lower than or equal to the predefined power threshold. The filter path selection system also comprises a power measurement circuit comprising a power detector. The power detector is configured to determine the measured power level of the predefined interference signal in the RF signal. The power detector is also configured to provide the measured power level of the predefined interference signal to the controller.

Another embodiment of the disclosure relates to a method for detecting a predefined interference signal in an RF signal. The method comprises receiving and filtering the RF signal to generate a first sample RF signal. The method also comprises measuring and recording a first power level of the first sample RF signal. The method also comprises measuring and recording a second power level of the received RF signal. The method also comprises determining a measured power level of the predefined interference signal by subtracting the measured second power level from the measured first power level. The method also comprises determining that the predefined interference signal is present in the RF signal if the measured power level of the predefined interference signal is higher than a predefined power threshold. The method also comprises determining that the predefined interference signal is absent from the RF signal if the measured power level of the predefined interference signal is lower than or equal to the predefined power threshold.

Another embodiment of the disclosure relates to a WDS. The WDS comprises a central unit. The central unit is configured to communicate a plurality of downlink communications signals via a plurality of downlink communications mediums. The central unit is also configured to receive a plurality of uplink communications signals via a plurality of uplink communications mediums. The WDS also comprises a plurality of remote units. The plurality of remote units is configured to receive the plurality of downlink communications signals via the plurality of downlink communications mediums. The plurality of remote units is also configured to communicate the plurality of uplink communications signals via the plurality of uplink communications mediums. Each of the plurality of remote units comprises a filter path selection system. The filter path selection system comprises a filter path selection circuit. The filter path selection circuit comprises an interference rejection filter path comprising a first RF filter. The first RF filter is configured to receive an RF signal from a first filter path input provided in the interference rejection filter path and communicatively coupled to one or more client devices in the WDS. The first RF filter is also configured to filter the received RF signal at a first rejection level to generate a first filter path output signal. The filter path selection circuit also comprises a pass filter path comprising a second RF filter. The second RF filter is configured to receive the RF signal from a second filter path input provided in the pass filter path and communicatively coupled to the one or more client devices in the WDS. The second RF filter is also configured to filter the received RF signal at a second rejection level lower than the first rejection level to generate a second filter path output signal. The filter path selection circuit also comprises a controller. The controller is configured to determine whether the RF signal comprises a predefined interference signal based on a measured power level of the predefined interference signal. The controller is also configured to couple the RF signal to the first filter path input of the interference rejection filter path if the measured power level of the predefined interference signal is higher than a predefined power threshold. The controller is also configured to couple the RF signal to the second filter path input of the pass filter path if the measured power level of the predefined interference signal is lower than or equal to the predefined power threshold. The filter path selection system also comprises a power measurement circuit comprising a power detector. The power detector is configured to determine the measured power level of the predefined interference signal in the RF signal. The power detector is also configured to provide the measured power level of the predefined interference signal to the controller.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A is a schematic diagram of an exemplary RF transceiver circuit including a plurality of radio transceivers that may interfere with each other without sufficient spectrum separation;

DETAILED DESCRIPTION

Embodiments of the disclosure relate to activating an interference signal rejection filter path based on detection of an interference signal in a wireless distribution system (WDS). For example, the WDS may be a distributed antenna system (DAS) configured to distribute radio-frequency (RF) signals over a communications medium to a plurality of remote units. The WDS may be configured to concurrently receive and transmit RF signals in adjacent frequency bands having limited spectrum separation. As such, an interference rejection filter(s) is often employed to reduce interference(s) that may occur between the concurrently received and transmitted RF signals. However, the interference rejection filter(s) employed to reduce interference(s) can potentially degrade the received RF signals. In this regard, in one aspect disclosed herein, a filter path selection circuit is provided in the WDS to opportunistically activate the interference rejection filter(s) when interference(s) is present. The filter path selection circuit is configured to activate an interference rejection filter path configured to suppress a predefined interference signal when the predefined interference signal is detected in a received RF signal. The filter path selection circuit is further configured to activate a pass filter path to allow the received RF signal to pass when the predefined interference signal is not detected in the received RF signal. In this manner, it is possible to dynamically respond to the predefined interference to avoid unnecessary degradation to the received RF signal, thus providing an enhanced overall RF performance in the WDS. Further, in another aspect, the filter path selection circuit is configured to detect the predefined interference signal by comparing a measured power level of the predefined interference signal against a predefined power threshold. As such, it is possible to configure the filter path selection circuit to respond to different power levels of the interference(s), thus enabling more flexible detection of the interference(s).

Before discussing examples of activating an interference signal rejection filter path based on detection of the interference signal starting at FIG. 4, an overview of RF interferences that may exist between LTE signals and Wi-Fi signals without sufficient spectrum separation, and a common technique for reducing the RF interferences between the LTE signals and the Wi-Fi signals are first discussed with reference to FIGS. 3A-3B.

Figure 1:
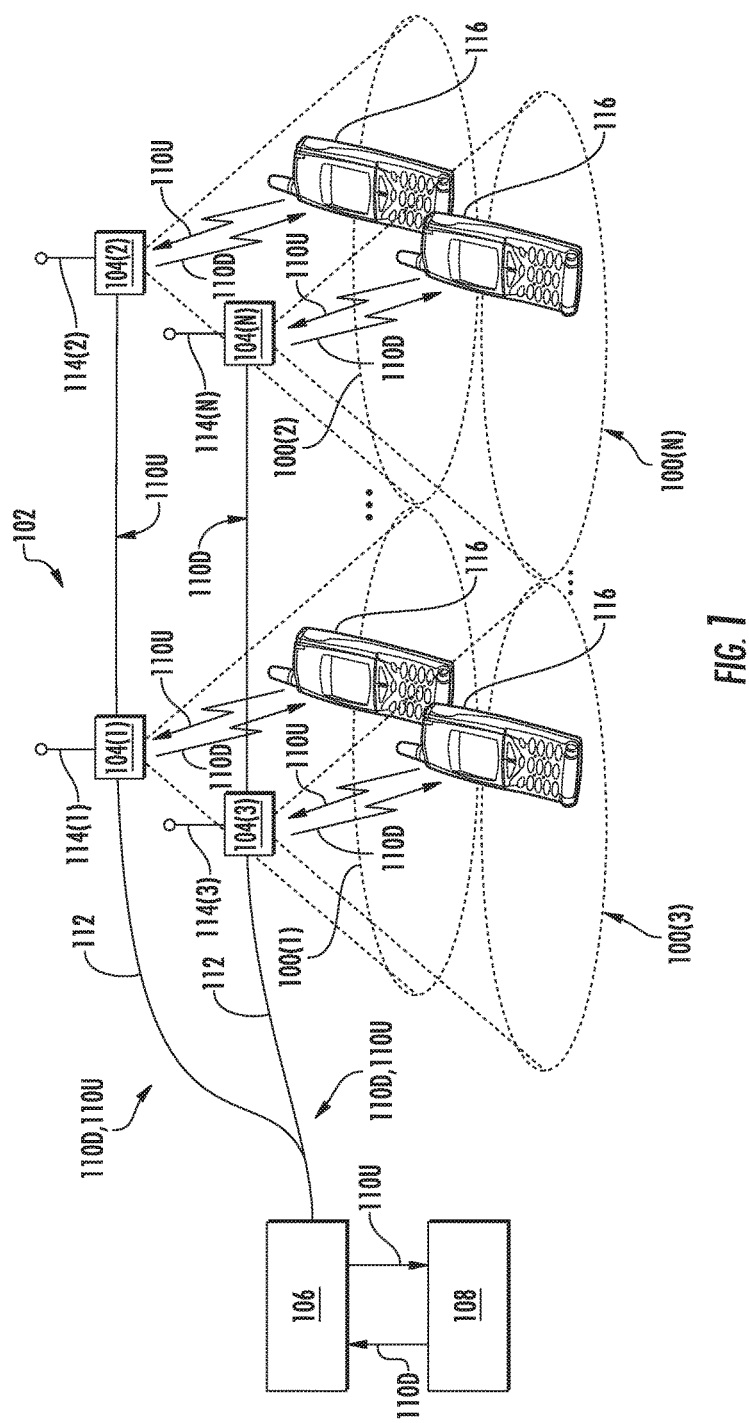
FIG. 1 is a schematic diagram of an exemplary wireless distribution system (WDS)

In this regard, FIG. 3A is a schematic diagram of an exemplary RF transceiver circuit 300 including a plurality of radio transceivers 302(1)-302(2) that may interfere with each other without sufficient spectrum separation. In a non-limiting example, the radio transceivers 302(1)-302(2) are co-located in the remote units 104(1)-104(N) of FIG. 1. The radio transceiver 302(1) is an LTE RF transceiver 302(1) configured to transmit an LTE downlink signal 304D and receive an LTE uplink signal 304U in a time-division duplex (TDD) mode in LTE band forty-one (41). The radio transceiver 302(2) is a Wi-Fi RF transceiver 302(2) configured to transmit a Wi-Fi downlink signal 306D and receive a Wi-Fi uplink signal 306U in Wi-Fi channel fourteen (14) (Ch14) of FIG. 2.

Figure 2:
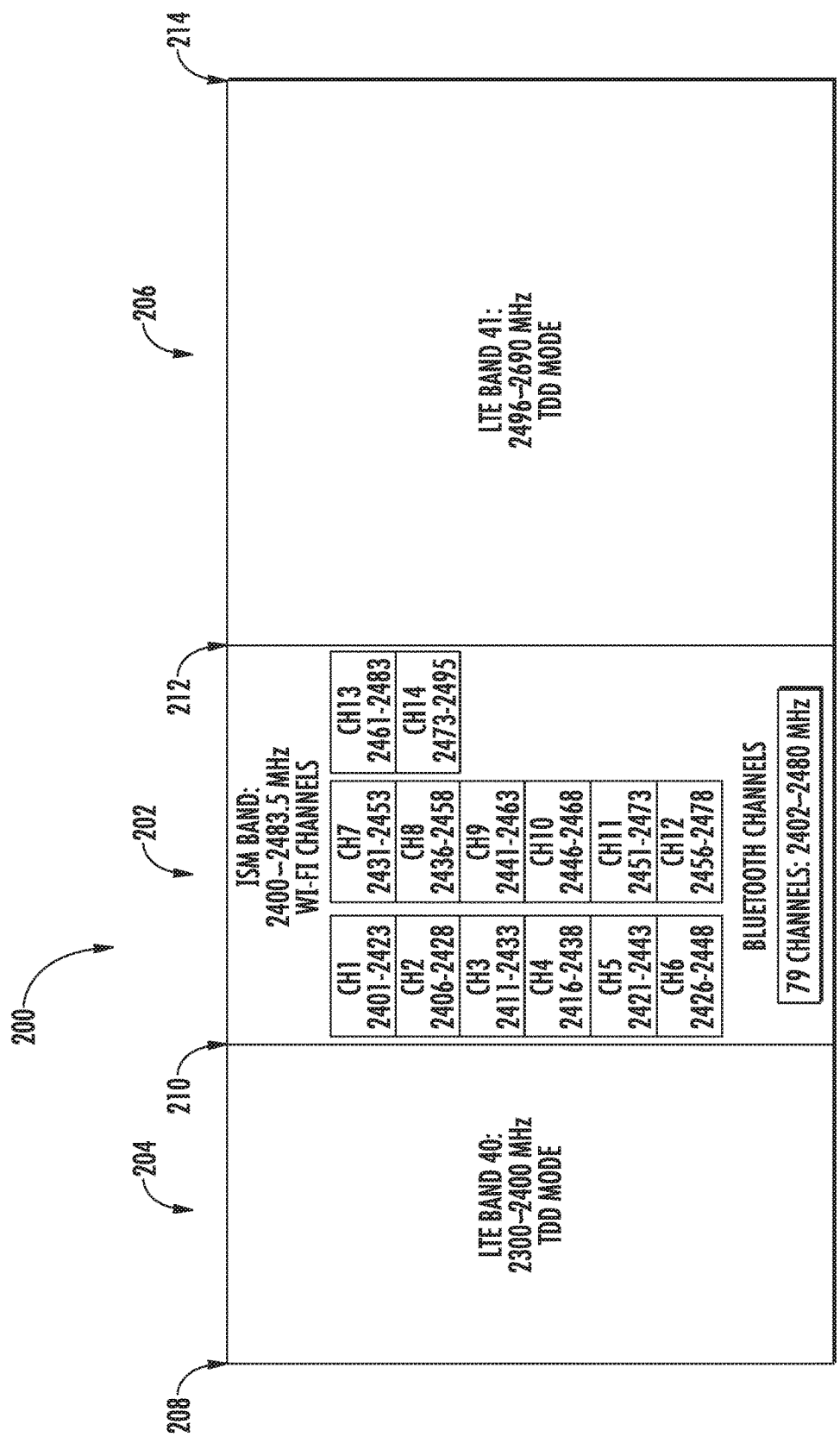
FIG. 2 is a schematic diagram of an exemplary radio frequency (RF) spectrum map including RF bands for providing cellular and local area network services in the WDS of FIG. 1.

According to previous discussions in FIG. 2, there is only one megahertz (1 MHz) separating the LTE band 41 and the Wi-Fi Ch14. As such, the LTE downlink signal 304D may interfere with the Wi-Fi uplink signal 306U, because the LTE downlink signal 304D is typically transmitted at a higher transmit power than a receive power at which the Wi-Fi uplink signal 306U is received. Likewise, the Wi-Fi downlink signal 306D may interfere with the LTE uplink signal 304U, because the Wi-Fi downlink signal 306D is typically transmitted at a higher transmit power than a receive power at which the LTE uplink signal 304U is received. The LTE RF transceiver 302(1) and the Wi-Fi RF transceiver 302(2) may be co-located in a confined space, such as the chassis of the remote units 104(1)-104(N) of FIG. 1, for example. As such, the interferences between the LTE RF transceiver 302(1) and the Wi-Fi RF transceiver 302(2) are referred to as coexistence interferences.

With continuing reference to FIG. 3A, the LTE RF transceiver 302(1) and the Wi-Fi RF transceiver 302(2) may also be subject to RF interferences from an external interferer 308. In a non-limiting example, the external interferer 308 is a microwave oven and/or a cordless phone. The external interferer 308 may emit RF signals 310 in the ISM band that can interfere with the LTE RF transceiver 302(1) and the Wi-Fi RF transceiver 302(2). The interferences generated by the external interferer 308 are often referred to as co-location interferences.

In a non-limiting example, a first RF filter 312 and a second RF filter 314 are provided in the RF transceiver circuit 300 to help reduce the coexistence interferences and/or the co-location interferences discussed above. The first RF filter 312 is coupled to or integrated with the LTE RF transceiver 302(1). The first RF filter 312 can be configured to suppress the Wi-Fi downlink signal 306D in the LTE uplink signal 304U before the LTE uplink signal 304U is processed by an LTE baseband circuit 316, thus providing additional interference protection for the LTE RF transceiver 302(1). The second RF filter 314 is coupled to or integrated with the Wi-Fi RF transceiver 302(2). The second RF filter 314 can be configured to suppress the LTE downlink signal 304D in the Wi-Fi uplink signal 306U before the Wi-Fi uplink signal 306U is processed by a Wi-Fi baseband circuit 318, thus providing additional interference protection for the Wi-Fi RF transceiver 302(2).

However, the first RF filter 312 and the second RF filter 314 may introduce insertion losses and cause unwanted ripples in the LTE uplink signal 304U and the Wi-Fi uplink signal 306U, respectively. In this regard, FIG. 3B is a graph 319 providing an exemplary illustration of frequency domain ripple that may be generated by the first RF filter 312 and/or the second RF filter 314 of FIG. 3A.

Figure 3B:
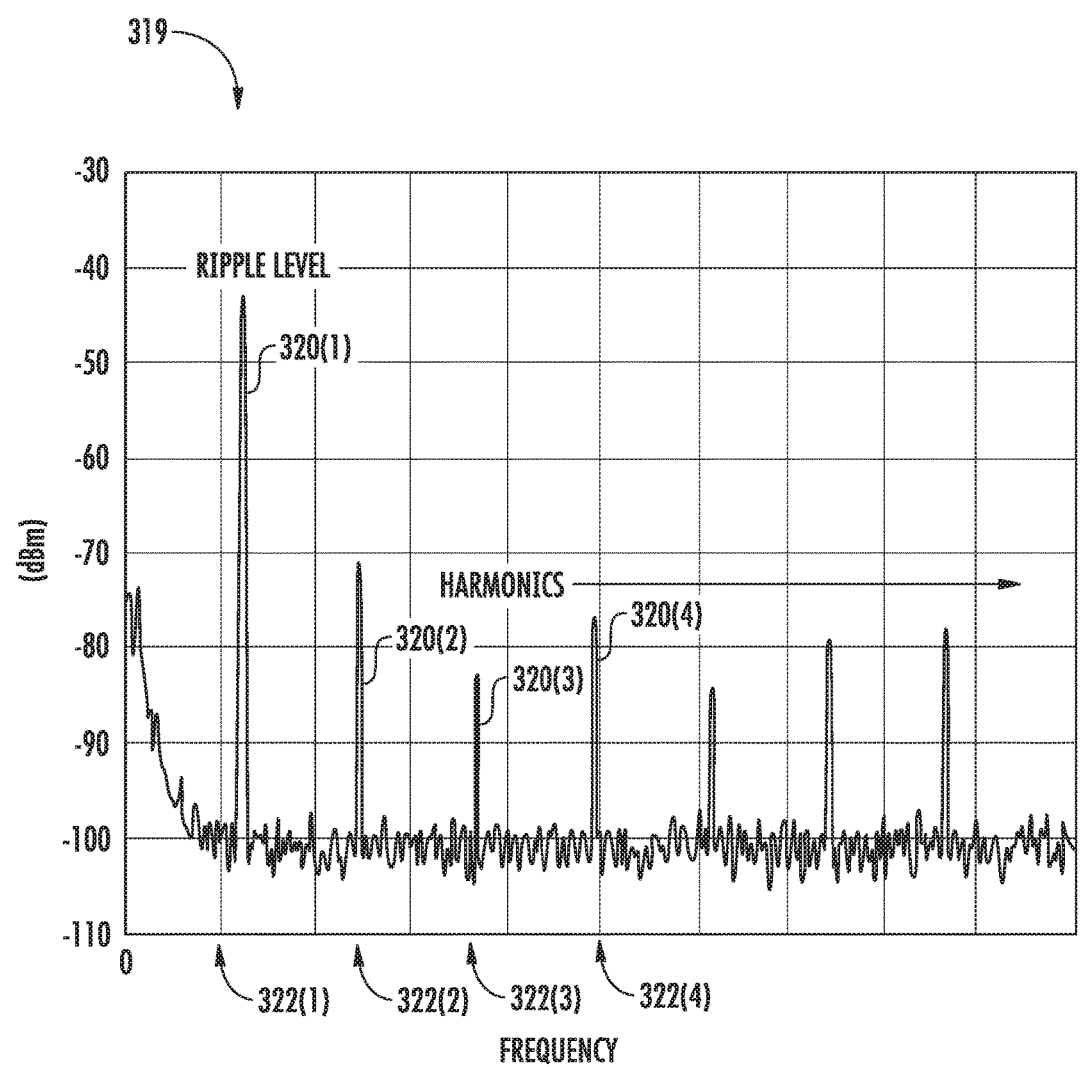
FIG. 3B is a graph providing an exemplary illustration of frequency domain ripple that may be generated by an RF filter configured to reduce RF interferences among the radio transceivers of FIG. 3A.

With reference to FIG. 3B, as a result of the insertion losses introduced by the first RF filter 312 and the second RF filter 314, the LTE uplink signal 304U and the Wi-Fi uplink signal 306U may exhibit different ripple levels at different harmonic frequencies. For example, a ripple level 320(1) at frequency 322(1) is approximately thirty-five decibels (35 dBm) higher than a ripple level 320(2) at frequency 322(2). In contrast, a ripple level 320(3) at frequency 322(3) is approximately eight decibels (8 dBm) lower than a ripple level 320(4) at frequency 322(4). In this regard, the ripple levels 320(1)-320(4) fluctuate between frequency 322(1) and frequency 322(4). Ripple level fluctuations can degrade signal-to-noise ratios (SNRs) of the LTE uplink signal 304U and the Wi-Fi uplink signal 306U. As a result, the LTE services and the Wi-Fi services provided by the RF transceiver circuit 300 of FIG. 3A may be degraded as well. Hence, it is desirable to opportunistically employ the first RF filter 312 and/or the second RF filter 314 when the coexistence interferences and/or the co-location interferences are detected.

Figure 4:
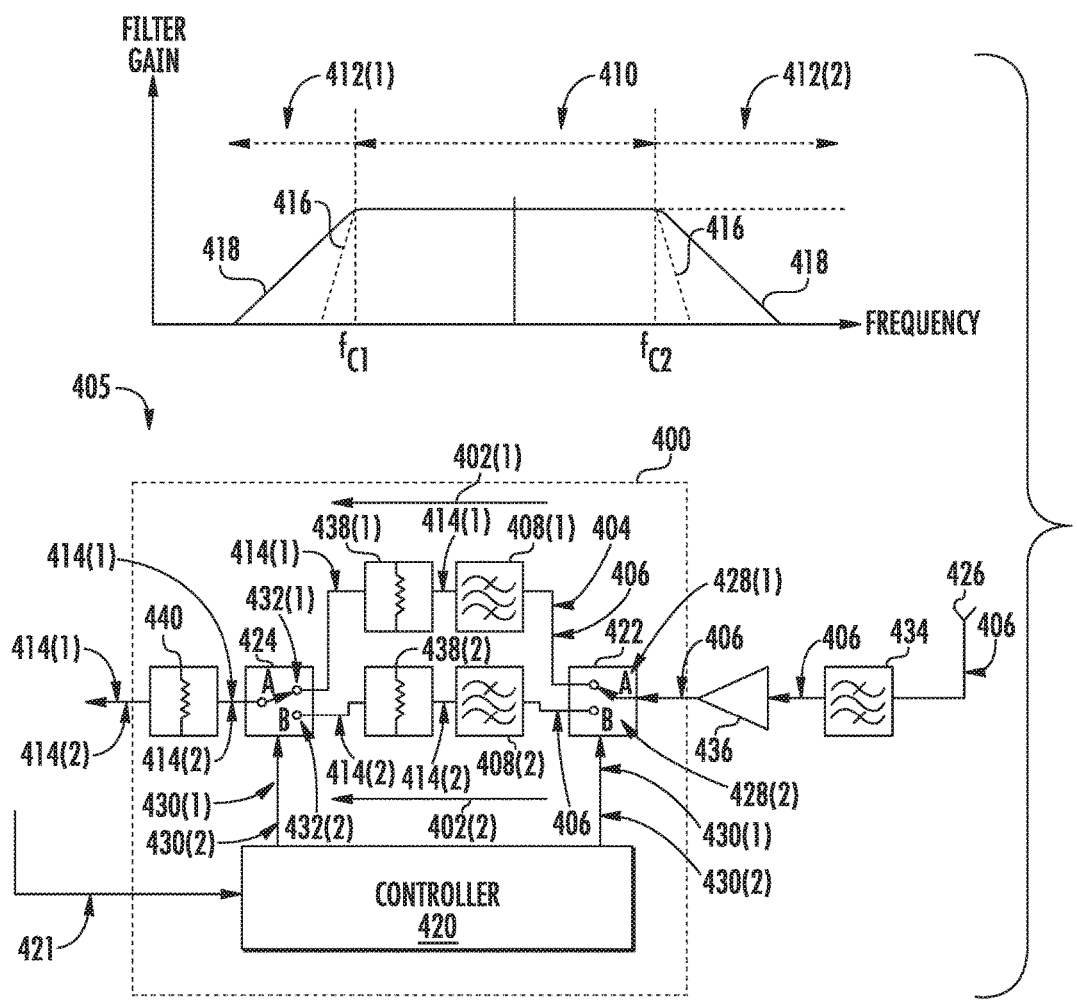
FIG. 4 is a schematic diagram of an exemplary filter path selection circuit configured to activate an interference rejection filter path to suppress a predefined interference signal in a WDS based on detection of the predefined interference signal in an RF signal.

In this regard, FIG. 4 is a schematic diagram of an exemplary filter path selection circuit 400 configured to opportunistically activate an interference rejection filter path 402(1) to suppress a predefined interference signal 404 in a WDS 405 based on detection of the predefined interference signal 404 in an RF signal 406. The interference rejection filter path 402(1) in this example includes a first RF filter 408(1), which may be a bulk acoustic wave (BAW) filter or a surface acoustic wave (SAW) filter, for example. When the interference rejection filter path 402(1) is activated, the RF signal 406 and the predefined interference signal 404 both pass through the first RF filter 408(1) in the interference rejection filter path 402(1). The first RF filter 408(1) is configured to pass the RF signal 406 in a pass-band region 410 and suppress the predefined interference signal 404 in stop-band regions 412(1), 412(2). The pass-band region 410 is bounded by a lower cutoff frequency ($f_{C1}$) and a higher cutoff frequency ($f_{C2}$). In this regard, the first RF filter 408(1) is configured to suppress the predefined interference signal 404 in the stop-band regions 412(1)-412(2).

In a first non-limiting example, the RF signal 406 is an LTE uplink communications signal communicated in the LTE band 41, and the predefined interference signal 404 is a Wi-Fi downlink communications signal communicated in the ISM band (e.g., Wi-Fi Ch14). In this regard, according to previous examples in FIG. 2, the pass-band region 410 is between 2496 MHz and 2690 MHz. The stop-band region 412(1) is between 2401 MHz and 2495 MHz. Accordingly, the lower cutoff frequency ($f_{C1}$) and the higher cutoff frequency ($f_{C2}$) are 2496 MHz and 2690 MHz, respectively. As such, the first RF filter 408(1) may be a high-pass filter or a band-pass filter.

In a second non-limiting example, the RF signal 406 is an LTE uplink communications signal communicated in the LTE band 40, and the predefined interference signal 404 is a Wi-Fi downlink communications signal communicated in the ISM band (e.g., Wi-Fi Ch1). In this regard, according to previous examples in FIG. 2, the pass-band region 410 is between 2300 MHz and 2400 MHz. The stop-band region 412(2) is between 2401 MHz and 2495 MHz. Accordingly, the lower cutoff frequency ($f_{C1}$) and the higher cutoff frequency ($f_{C2}$) are 2300 MHz and 2400 MHz, respectively. As such, the first RF filter 408(1) may be a low-pass filter or a band-pass filter.

In a third non-limiting example, the RF signal 406 is a Wi-Fi uplink communications signal communicated in the ISM band (e.g., Wi-Fi Ch14), and the predefined interference signal 404 is an LTE downlink communications signal communicated in the LTE band 41. In this regard, according to previous examples in FIG. 2, the pass-band region 410 is between 2401 MHz and 2495 MHz. The stop-band region 412(2) is between 2496 MHz and 2690 MHz. Accordingly, the lower cutoff frequency ($f_{C1}$) and the higher cutoff frequency ($f_{C2}$) are 2401 MHz and 2495 MHz, respectively. As such, the first RF filter 408(1) may be a low-pass filter or a band-pass filter.

In a fourth non-limiting example, the RF signal 406 is a Wi-Fi uplink communications signal communicated in the ISM band (e.g., Wi-Fi Ch1), and the predefined interference signal 404 is an LTE downlink communications signal communicated in the LTE band 40. In this regard, according to previous examples in FIG. 2, the pass-band region 410 is between 2401 MHz and 2495 MHz. The stop-band region 412(1) is between 2300 MHz and 2400 MHz. Accordingly, the lower cutoff frequency ($f_{C1}$) and the higher cutoff frequency ($f_{C2}$) are 2401 MHz and 2495 MHz, respectively. As such, the first RF filter 408(1) may be a high-pass filter or a band-pass filter.

The first RF filter 408(1) is configured to filter the RF signal 406 at a first rejection level to generate a first filter path output signal 414(1) in the pass-band region 410. In this regard, the interference rejection filter path 402(1) is an interference signal rejection filter path configured to suppress the predefined interference signal 404 in the stop-band region 412(1) and/or the stop-band region 412(2). The first rejection level determines the signal rejection capability of the first RF filter 408(1) in the stop-band region 412(1) and/or the stop-band region 412(2). In other words, the first rejection level defines how much of the predefined interference signal 404 the first RF filter 408(1) is able to reject in the stop-band region 412(1) and/or the stop-band region 412(2). A higher value of the first rejection level corresponds to a steeper rejection slope 416 in the stop-band regions 412(1), 412(2). As a result, the first RF filter 408(1) is capable of rejecting a larger portion of the predefined interference signal 404 in the stop-band region 412(1) and/or the stop-band region 412(2). In contrast, a lower value of the first rejection level corresponds to a shallower slope 418 in the stop-band regions 412(1), 412(2). As a result, the first RF filter 408(1) is able to reject a smaller portion of the predefined interference signal 404 in the stop-band region 412(1) and/or the stop-band region 412(2).

As such, it may be desired to configure the first RF filter 408(1) with a higher first rejection level to reject as much of the predefined interference signal 404 in the stop-band region 412(1) and/or the stop-band region 412(2) as possible. Unfortunately, increasing the first rejection level of the first RF filter 408(1) can cause higher insertion losses in the interference rejection filter path 402(1). According to previous discussions in FIG. 2B, the frequency-domain ripples resulting from the higher insertion losses can degrade the RF signal 406 in the pass-band region 410. However, the benefits of configuring the first RF filter 408(1) with the higher first rejection level to suppress most of the predefined interference signal 404 outweighs the harm caused by the frequency-domain ripples. This may be particularly true with regard to reducing the coexistence interferences.

Nonetheless, it may be desirable to opportunistically activate the interference rejection filter path 402(1) when the predefined interference signal 404 is detected in the RF signal 406. In this regard, the filter path selection circuit 400 includes a controller 420. The controller 420 is configured to determine whether the predefined interference signal 404 is present in the RF signal 406. When the predefined interference signal 404 is detected in the RF signal 406, the controller 420 activates the interference rejection filter path 402(1).

The filter path selection circuit 400 also includes a pass filter path 402(2). The pass filter path 402(2) includes a second RF filter 408(2), which may be a BAW filter or a SAW filter, for example. When the controller 420 determines that the predefined interference signal 404 is absent from the RF signal 406, the controller 420 activates the pass filter path 402(2) and deactivates the interference rejection filter path 402(1). When the pass filter path 402(2) is activated, the RF signal 406 passes through the second RF filter 408(2) in the pass filter path 402(2). The second RF filter 408(2) is configured to filter the RF signal 406 at a second rejection level lower than the first rejection level of the first RF filter 408(1) to generate a second filter path output signal 414(2) in the pass-band region 410.

In this regard, in a non-limiting example, the second rejection level of the second RF filter 408(2) corresponds to the shallower slope 418, while the first rejection level of the first RF filter 408(1) corresponds to the steeper slope 416 in the stop-band regions 412(1), 412(2). As such, the second RF filter 408(2) will cause less insertion losses, and thus less frequency-domain ripples, compared to the first RF filter 408(1). Hence, the RF signal 406 will suffer less degradation when passing through the second RF filter 408(2) in the pass filter path 402(2). By opportunistically activating the interference rejection filter path 402(1) or the pass filter path 402(2) based on the presence or absence of the predefined interference signal 404, it is possible to dynamically adapt the filter path selection circuit 400 to surrounding RF environments, thus enabling enhanced RF filtering performance for the RF signal 406.

The controller 420 is configured to determine whether the predefined interference signal 404 is present in the RF signal 406 based on a measured power level 421 of the predefined interference signal 404. The measured power level 421 of the predefined interference signal 404 may be determined using a power detection circuit, which will be further discussed later in reference to FIG. 6. The controller 420 is configured to compare the measured power level 421 against a predefined power threshold. In a non-limiting example, the predefined power threshold is stored in a memory (not shown) of the controller 420. The controller 420 activates the interference rejection filter path 402(1) when the measured power level 421 is higher than the predefined power threshold. The controller 420 activates the pass filter path 402(2) when the measured power level 421 is lower than or equal to the predefined power threshold.

With continuing reference to FIG. 4, the filter path selection circuit 400 includes an input signal switch 422 and an output signal switch 424. The input signal switch 422 is communicatively coupled to an RF antenna 426 communicatively coupled to one or more client devices (not shown), which may be a multiple-input multiple-output (MIMO) antenna, for example. The input signal switch 422 is configured to receive the RF signal 406, which may include the predefined interference signal 404, from the RF antenna 426.

The input signal switch 422 is configured to toggle between a first filter path input 428(1) and a second filter path input 428(2). The first filter path input 428(1) is provided in the interference rejection filter path 402(1) and communicatively coupled to the one or more client devices in the WDS 405. The second filter path input 428(2) is provided in the pass filter path 402(2) and communicatively coupled to the client devices in the WDS 405. The controller 420 controls the input signal switch 422 based on a first filter path selection signal 430(1) or a second filter path selection signal 430(2). The controller 420 generates the first filter path selection signal 430(1) to activate the interference rejection filter path 402(1) when the controller 420 determines that the predefined interference signal 404 is present in the RF signal 406. In contrast, the controller 420 generates the second filter path selection signal 430(2) to activate the pass filter path 402(2) when the controller 420 determines that the predefined interference signal 404 is absent from the RF signal 406.

If the RF signal 406 includes the predefined interference signal 404, then the input signal switch 422 couples the RF signal 406 to the first filter path input 428(1) in response to receiving the first filter path selection signal 430(1) from the controller 420. As a result, the first RF filter 408(1) receives the RF signal 406 from the first filter path input 428(1). If the RF signal 406 does not include the predefined interference signal 404, then the input signal switch 422 couples the RF signal 406 to the second filter path input 428(2) in response to receiving the second filter path selection signal 430(2) from the controller 420. As a result, the second RF filter 408(2) receives the RF signal 406 from the second filter path input 428(2).

The output signal switch 424 is configured to toggle between a first filter path output 432(1) and a second filter path output 432(2). The controller 420 controls the output signal switch 424 based on the first filter path selection signal 430(1) or the second filter path selection signal 430(2). The output signal switch 424 couples the interference rejection filter path 402(1) to the first filter path output 432(1) in response to receiving the first filter path selection signal 430(1) from the controller 420. As a result, the interference rejection filter path 402(1) provides the first filter path output signal 414(1) to the first filter path output 432(1). The output signal switch 424 couples the pass filter path 402(2) to the second filter path output 432(2) in response to receiving the second filter path selection signal 430(2) from the controller 420. As a result, the pass filter path 402(2) provides the second filter path output signal 414(2) to the second filter path output 432(2).

With continuing reference to FIG. 4, in a non-limiting example, the filter path selection circuit 400 includes a band-pass filter 434 and a power amplifier 436. The band-pass filter 434 may be coupled to the RF antenna 426 to filter the RF signal 406 received by the RF antenna 426. The power amplifier 436 may be coupled to the band-pass filter 434 to amplify a power level of the RF signal 406 received via the RF antenna 426.

The interference rejection filter path 402(1) may include a first attenuator 438(1) configured to adjust power of the first filter path output signal 414(1) to a respective desirable level. The pass filter path 402(2) may include a second attenuator 438(2) configured to adjust power of the second filter path output signal 414(2) to a respective desirable level. The filter path selection circuit 400 may also include an output attenuator 440. The output attenuator 440 receives the first filter path output signal 414(1) or the second filter path output signal 414(2) from the output signal switch 424. The output attenuator 440 is configured to adjust power of the first filter path output signal 414(1) or the second filter path output signal 414(2) to a desired level.

The controller 420 may be configured to opportunistically activate the interference rejection filter path 402(1) or the pass filter path 402(2) according to a filter path selection process. In this regard, FIG. 5 is a flowchart of an exemplary process 500 that the controller 420 in the filter path selection circuit 400 of FIG. 4 can employ to select the interference rejection filter path 402(1) to reject the predefined interference signal 404 in the WDS 405 when the predefined interference signal 404 is determined to be present in the RF signal 406.

Figure 5:
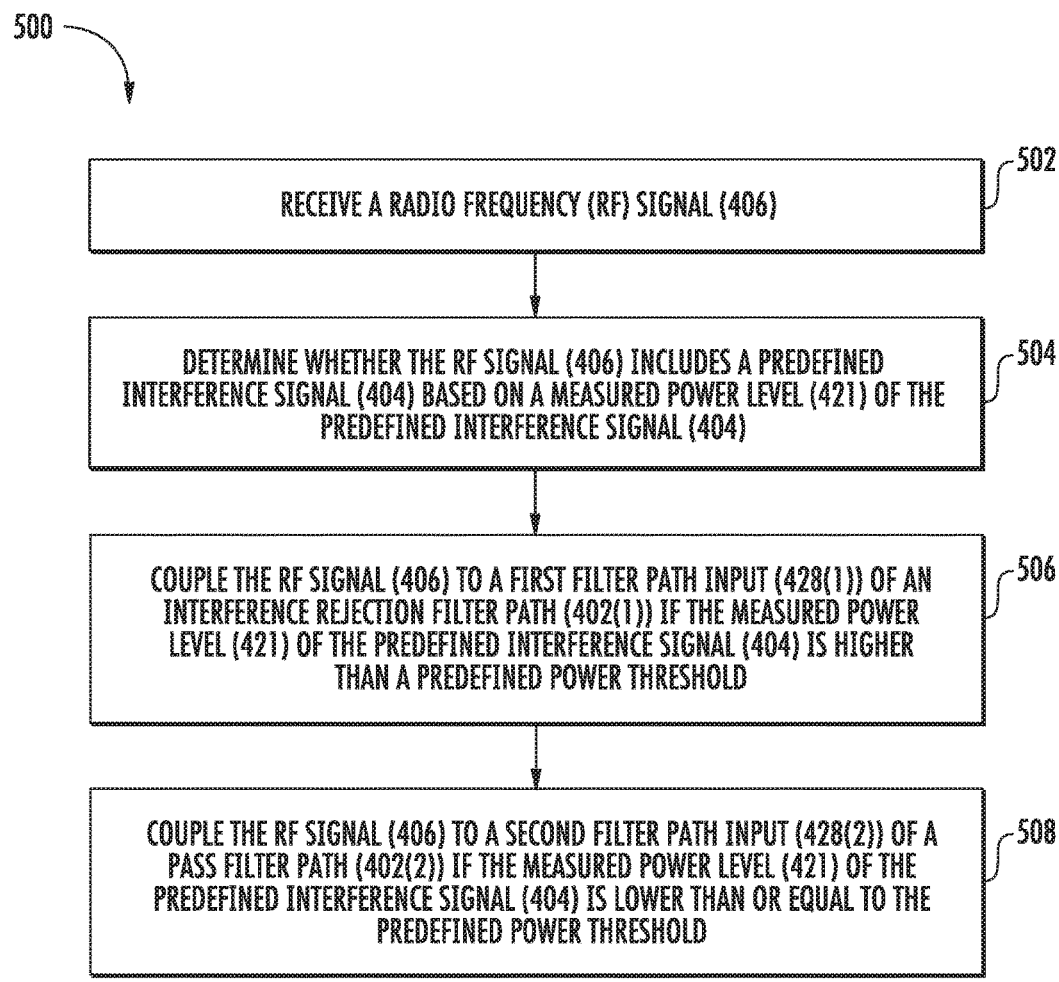
FIG. 5 is a flowchart of an exemplary process that a controller in the filter path selection circuit of FIG. 4 can employ to select the interference rejection filter path to reject the predefined interference signal in the WDS when the predefined interference signal is determined to be present in the RF signal.

With reference to FIG. 5, the filter path selection circuit 400 receives the RF signal 406 (block 502). The controller 420 determines whether the RF signal 406 includes the predefined interference signal 404 based on the measured power level 421 of the predefined interference signal 404 (block 504). The controller 420 couples the RF signal 406 to the first filter path input 428(1) of the interference rejection filter path 402(1) if the measured power level 421 is higher than the predefined power threshold (block 506). The controller 420 couples the RF signal 406 to the second filter path input 428(2) of the pass filter path 402(2) if the measured power level 421 is lower than or equal to the predefined power threshold (block 508).

Figure 6:
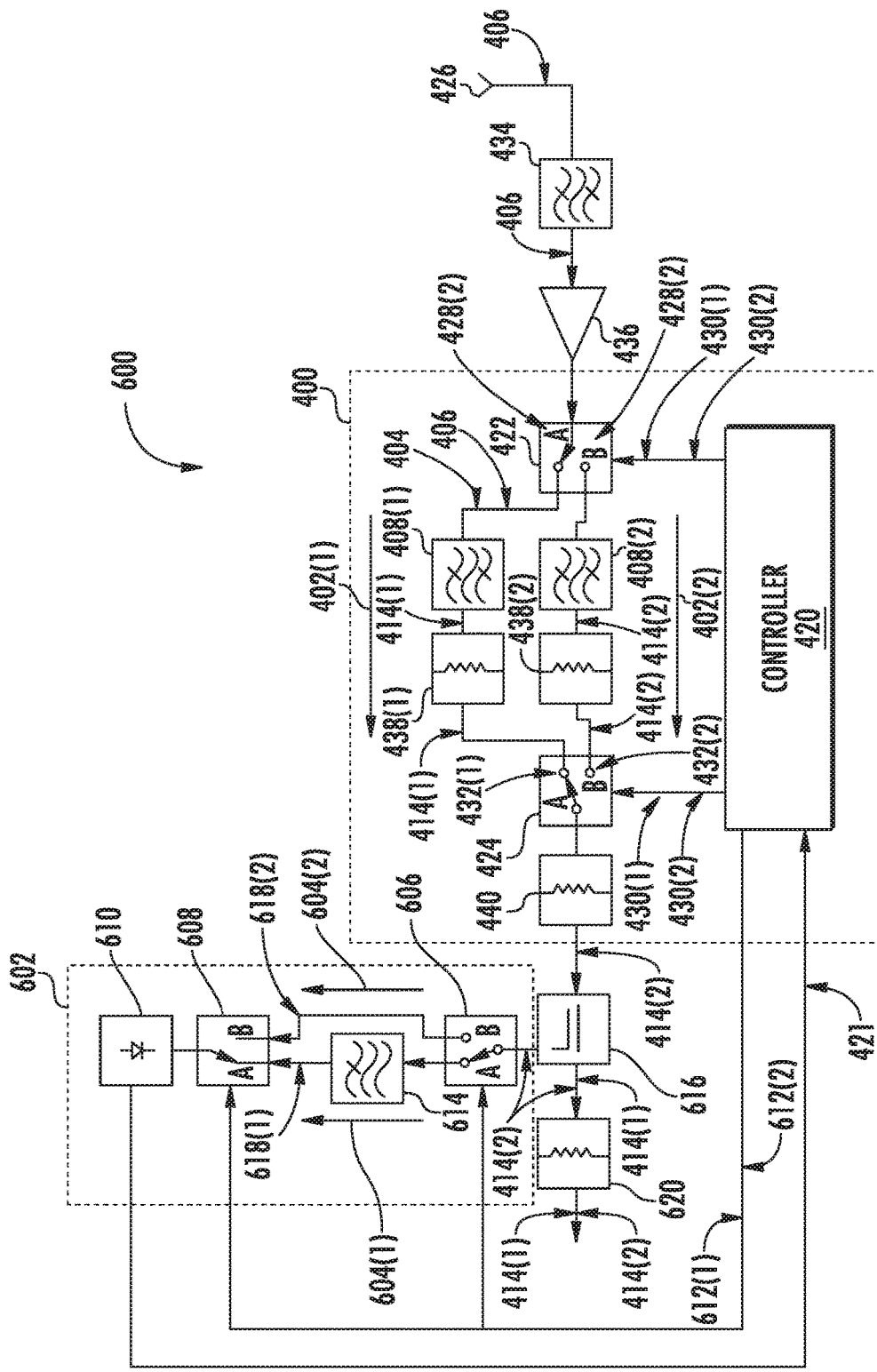
FIG. 6 is a schematic diagram of an exemplary filter path selection system including the filter path selection circuit of FIG. 4 configured to detect the predefined interference signal in the WDS based on a measured power level received from a power measurement circuit and activate an interference rejection filter path based on detection of the predefined interference signal.

As previously discussed, the controller 420 is configured to determine whether the predefined interference signal 404 is present in the RF signal 406 based on the measured power level 421 of the predefined interference signal 404. In this regard, FIG. 6 is a schematic diagram of an exemplary filter path selection system 600 including the filter path selection circuit 400 of FIG. 4 configured to detect the predefined interference signal 404 in the WDS 405 based on the measured power level 421 received from a power measurement circuit 602. Common elements between FIGS. 4 and 6 are shown therein with common element numbers and will not be re-described herein.

With reference to FIG. 6, the power measurement circuit 602 is configured to determine the measured power level 421 of the predefined interference signal 404 in the RF signal 406 and provide the measured power level 421 to the controller 420. The power measurement circuit 602 includes a first power detection path 604(1) and a second power detection path 604(2). The power measurement circuit 602 includes a first switch 606, a second switch 608, and a power detector 610. The controller 420 couples the first switch 606 and the second switch 608 to the first power detection path 604(1) via a first power detection path selection signal 612(1). The controller 420 couples the first switch 606 and the second switch 608 to the second power detection path 604(2) via a second power detection path selection signal 612(2). In a non-limiting example, the power detector 610 is coupled to the second switch 608. As such, the second switch 608 couples the power detector 610 to the first power detection path 604(1) or the second power detection path 604(2) in response to receiving the first power detection path selection signal 612(1) or the second power detection path selection signal 612(2). In a non-limiting example, the first power detection path 604(1) includes a signal filter 614. The second power detection path 604(2) is a direct connection (e.g., short circuit) between the first switch 606 and the second switch 608.

To determine the measured power level 421 of the predefined interference signal 404 in the RF signal 406, the controller 420 couples the input signal switch 422 and the output signal switch 424 to the second filter path input 428(2) and the second filter path output 432(2), respectively, via the second filter path selection signal 430(2). Accordingly, the second RF filter 408(2) in the pass filter path 402(2) generates the second filter path output signal 414(2). In a non-limiting example, the second filter path output signal 414(2) is provided to the first switch 606 via a coupler 616.

The controller 420 also couples the first switch 606 and the second switch 608 to the first power detection path 604(1) via the first power detection path selection signal 612(1). As such, the signal filter 614 receives the second filter path output signal 414(2) via the first switch 606. The signal filter 614 is configured to filter the second filter path output signal 414(2) to generate a first sample RF signal 618(1) and provide the first sample RF signal 618(1) to the second switch 608. The power detector 610 receives the first sample RF signal 618(1) from the second switch 608 and measures a first power level ($P_A$) of the first sample RF signal 618(1). In a non-limiting example, the power detector 610 records the first power level ($P_A$) in a register (not shown).

Next, the controller 420 couples the first switch 606 and the second switch 608 to the second power detection path 604(2) via the second power detection path selection signal 612(2). As such, the second switch 608 receives the second filter path output signal 414(2) as a second sample RF signal 618(2) from the first switch 606. The power detector 610 receives the second sample RF signal 618(2) from the second switch 608 and measures a second power level ($P_B$) of the second sample RF signal 618(2). In a non-limiting example, the power detector 610 also records the second power level ($P_B$) in the register. The power detector 610 then determines the measured power level 421 by subtracting the second power level ($P_B$) from the first power level ($P_A$) (the measured power level $421 = P_A - P_B$). The power detector 610 is further configured to provide the measured power level 421 to the controller 420 in the filter path selection circuit 400.

Upon receiving the measured power level 421 from the power measurement circuit 602, the controller 420 compares the measured power level 421 against the predefined power threshold to determine whether the predefined interference signal 404 is present in the RF signal 406. In a non-limiting example, the controller 420 can control the power measurement circuit 602 to determine the measured power level 421 periodically or randomly. As such, the filter path selection system 600 is able to dynamically respond to the predefined interference signal 404 that may come and go periodically.

The filter path selection system 600 may be configured to output the first filter path output signal 414(1) and the second filter path output signal 414(2) to other circuitries (not shown). In this regard, the filter path selection system 600 may include an attenuator 620 to adjust the first filter path output signal 414(1) and the second filter path output signal 414(2) to appropriate power levels.

The filter path selection system 600 may be configured to detect the predefined interference signal 404 in the RF signal 406 according to an interference signal detection process. In this regard, FIG. 7 is a flowchart of an exemplary process 700 that can be employed by the filter path selection system 600 of FIG. 6 to detect the predefined interference signal 404.

Figure 7:
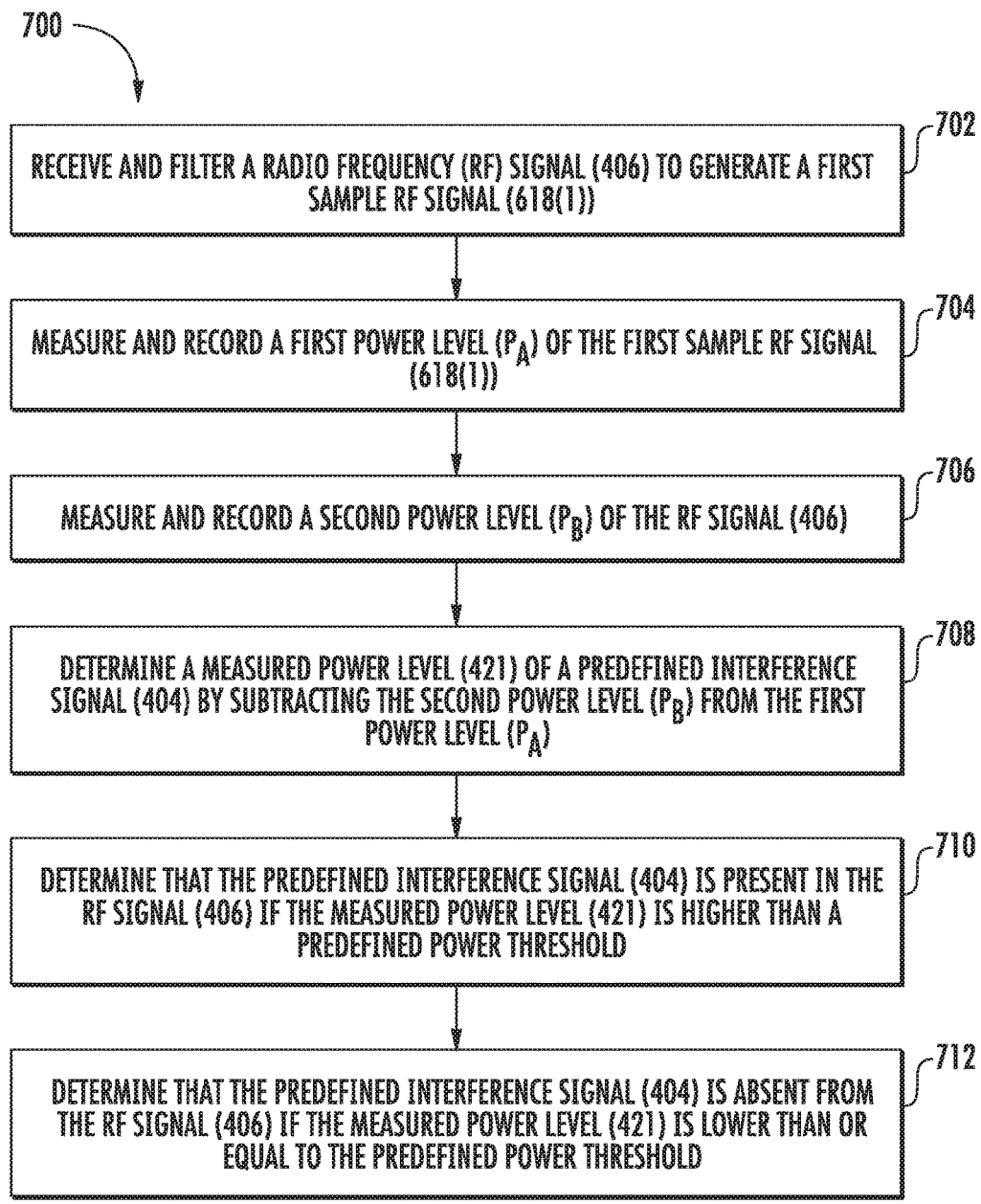
FIG. 7 is a flowchart of an exemplary process that can be employed by the filter path selection system of FIG. 6 to detect the predefined interference signal in the WDS to activate an interference rejection filter path based on detection of the predefined interference signal.

With reference to FIG. 7, the signal filter 614 in the first power detection path 604(1) receives and filters the RF signal 406 to generate the first sample RF signal 618(1) (block 702). The power detector 610 measures and records the first power level ($P_A$) of the first sample RF signal 618(1) (block 704). The power detector 610 then measures and records the second power level ($P_B$) of the RF signal 406 (block 706). The power detector 610 then determines the measured power level 421 of the predefined interference signal 404 by subtracting the second power level ($P_B$) from the first power level ($P_A$) (block 708). The controller 420 determines that the predefined interference signal 404 is present in the RF signal 406 if the measured power level 421 is higher than the predefined power threshold (block 710). The controller 420 determines that the predefined interference signal 404 is absent from the RF signal 406 if the measured power level 421 is lower than or equal to the predefined power threshold (block 712).

Figure 8:
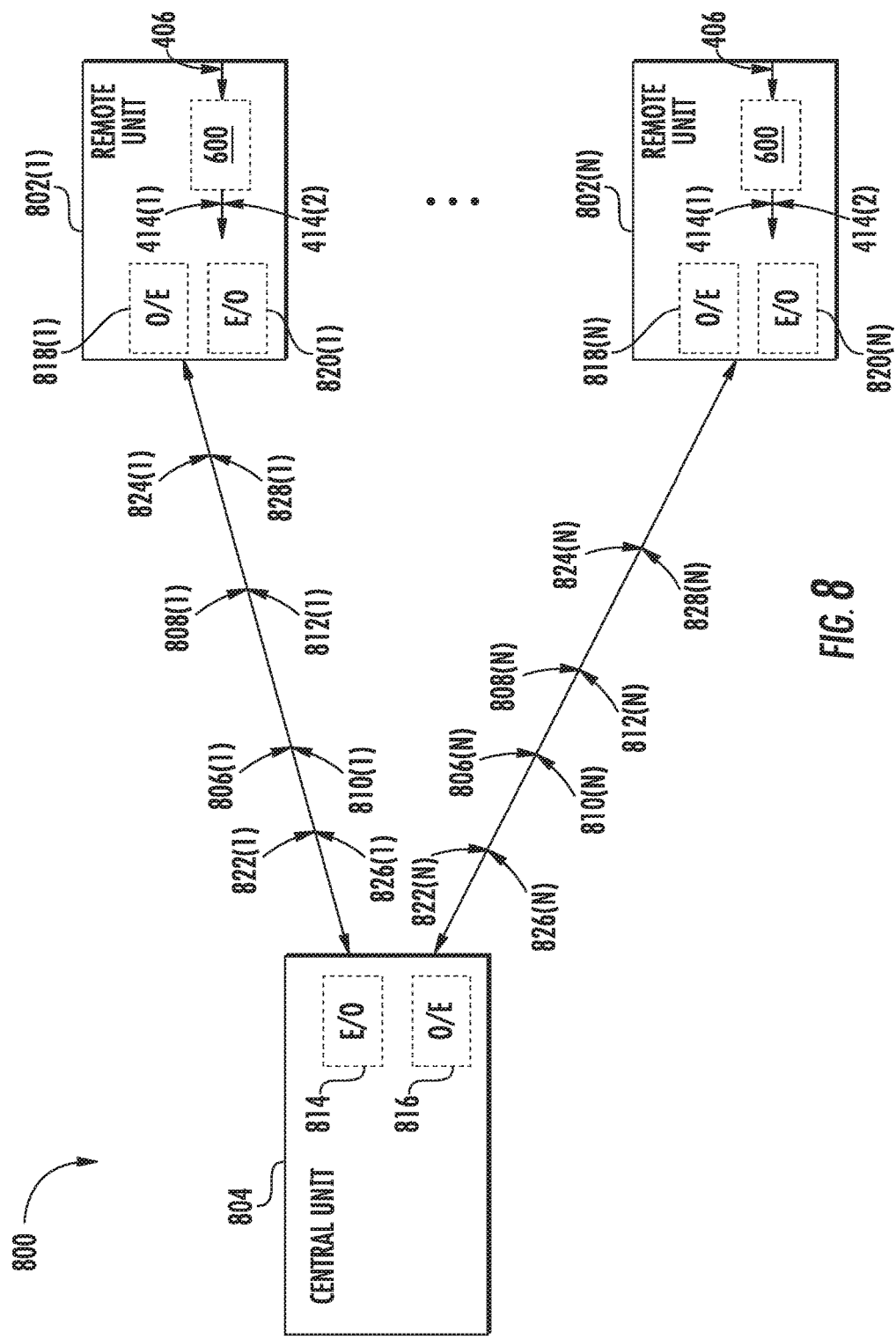
FIG. 8 is a schematic diagram of an exemplary WDS including a plurality of remote units each including the filter path selection system of FIG. 6 to detect the predefined interference signal in the WDS of FIG. 4 and activate an interference rejection filter path based on detection of the predefined interference signal.

The filter path selection system 600 may be provided in a WDS to help detect coexistence interferences and/or co-location interferences. In this regard, FIG. 8 is a schematic diagram of an exemplary WDS 800 including a plurality of remote units 802(1)-802(N), each including the filter path selection system 600 of FIG. 6 to detect the predefined interference signal 404. Common elements between FIGS. 6 and 8 are shown therein with common element numbers and will not be re-described herein.

With reference to FIG. 8, the WDS 800 includes a central unit 804. The central unit 804 is configured to communicate a plurality of downlink communications signals 806(1)-806(N) to the remote units 802(1)-802(N) via a plurality of downlink communications mediums 808(1)-808(N), respectively. The central unit 804 is also configured to receive a plurality of uplink communications signals 810(1)-810(N) from the remote units 802(1)-802(N) via a plurality of uplink communications mediums 812(1)-812(N), respectively.

Each remote unit 802 among the remote units 802(1)-802(N) includes the filter path selection system 600. According to previous discussions in FIG. 6, the filter path selection system 600 receives the RF signal 406. The filter path selection system 600 outputs the first filter path output signal 414(1) when the predefined interference signal 404 is present in the RF signal 406, or outputs the second filter path output signal 414(2) when the predefined interference signal 404 is absent from the RF signal 406. In this regard, each of the remote units 802(1)-802(N) communicates the first filter path output signal 414(1) as an uplink communications signal among the uplink communications signals 810(1)-810(N) when the predefined interference signal 404 is present in the RF signal 406. In contrast, each of the remote units 802(1)-802(N) communicates the second filter path output signal 414(2) as the uplink communications signal among the uplink communications signals 810(1)-810(N) when the predefined interference signal 404 is absent from the RF signal 406.

The central unit 804 may include an electrical-to-optical (E/O) converter 814 and an optical-to-electrical (O/E) converter 816. The remote units 802(1)-802(N) may include a plurality of remote unit O/E converters 818(1)-818(N) and a plurality of remote unit E/O converters 820(1)-820(N), respectively. In this regard, the E/O converter 814 converts the downlink communications signals 806(1)-806(N) into a plurality of optical downlink communications signals 822(1)-822(N) for communicating to the remote units 802(1)-802(N) over a plurality of optical fiber-based downlink communications mediums 824(1)-824(N), respectively. The remote unit O/E converters 818(1)-818(N) convert the optical downlink communications signals 822(1)-822(N) back into the downlink communications signals 806(1)-806(N), respectively.

The remote unit E/O converters 820(1)-820(N) convert the uplink communications signals 810(1)-810(N) into a plurality of optical uplink communications signals 826(1)-826(N) for communicating over a plurality of optical fiber-based uplink communications mediums 828(1)-828(N), respectively. The O/E converter 816 converts the optical uplink communications signals 826(1)-826(N) back into the uplink communications signals 810(1)-810(N), respectively.

Figure 9:
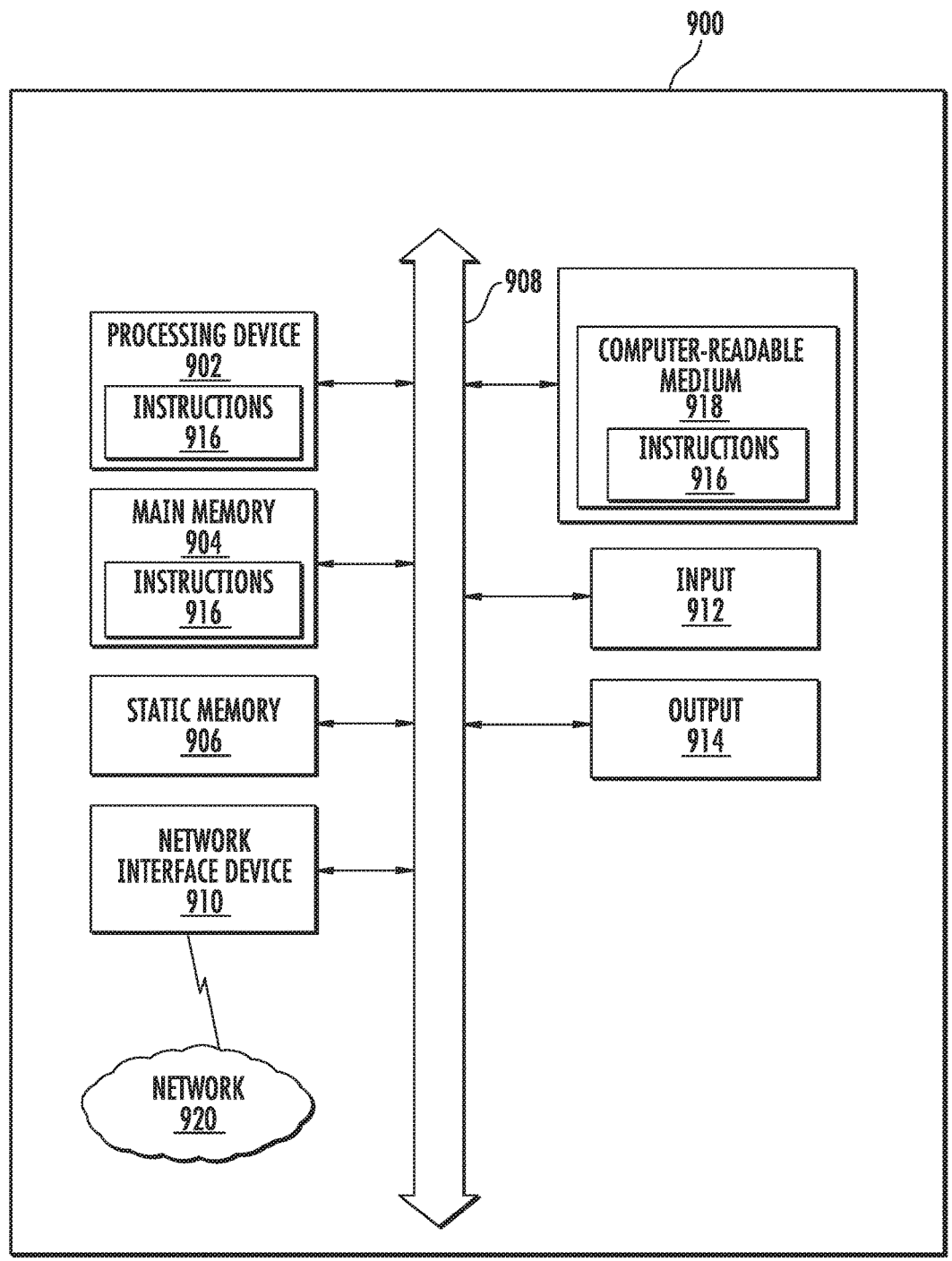
FIG. 9 is a schematic diagram representation of additional detail illustrating an exemplary computer system that could be employed in a controller in the filter path selection circuit of FIG. 4 and the filter path selection system of FIG. 6, for activating an interference rejection filter path based on detection of an interference signal in a WDS.

FIG. 9 is a schematic diagram representation of additional detail illustrating an exemplary computer system 900 that could be employed in a controller, including the controller 420 in the filter path selection circuit 400 of FIG. 4 and the filter path selection system 600 of FIG. 6, for activating an interference rejection filter path based on detection of the predefined interference signal 404 in the RF signal 406. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to predict frequency interference to avoid or reduce interference in a multi-frequency DAS. The computer system 900 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing device or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. In a non-limiting example, the main memory 904 may store the predefined power threshold for comparison against the measured power level 421 of FIGS. 4 and 6. Alternatively, the processor 902 may be connected to the main memory 904 and/or the static memory 906 directly or via some other connectivity means. The processor 902 may be a controller, and the main memory 904 or the static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

Figure 10:
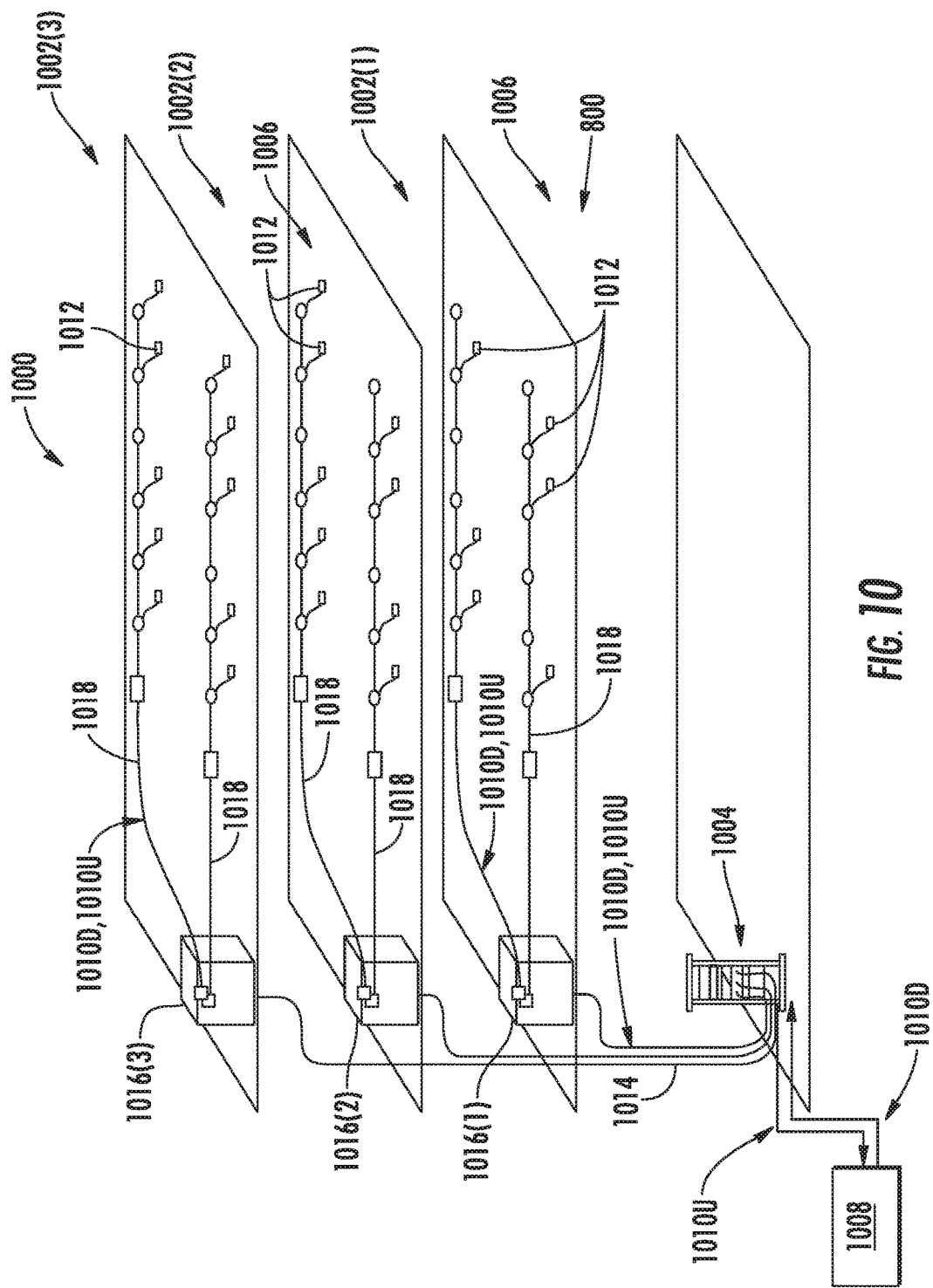
FIG. 10 is a partial schematic cut-away diagram of an exemplary building infrastructure in which the WDS of FIG. 8 can be provided.

The WDS 800 of FIG. 8, which employs the filter path selection system 600 of FIG. 6 for detecting and reducing coexistence and/or co-location interferences, may be provided in an indoor environment, as illustrated in FIG. 10. FIG. 10 is a partial schematic cut-away diagram of an exemplary building infrastructure 1000 in which WDSs, such as the WDS 800 of FIG. 8, can be employed. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. The downlink communications signals 1010D and the uplink communications signals 1010U communicated between the central unit 1004 and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, RAM, a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
  a central unit configured to:
    communicate a plurality of downlink communications signals via a plurality of downlink communications mediums; and
    receive a plurality of uplink communications signals via a plurality of uplink communications mediums; and
  a plurality of remote units configured to:
    receive the plurality of downlink communications signals via the plurality of downlink communications mediums; and
    communicate the plurality of uplink communications signals via the plurality of uplink communications mediums;
  wherein each of the plurality of remote units comprises a filter path selection system that comprises:
    a filter path selection circuit, comprising:
      an interference rejection filter path comprising a first radio frequency (RF) filter, the first RF filter configured to:
        receive an RF signal from a first filter path input provided in the interference rejection filter path and communicatively coupled to one or more client devices in the WDS; and
        filter the received RF signal at a first rejection level to generate a first filter path output signal;
      a pass filter path comprising a second RF filter, the second RF filter configured to:
        receive the RF signal from a second filter path input provided in the pass filter path and communicatively coupled to the one or more client devices; and
        filter the received RF signal at a second rejection level lower than the first rejection level to generate a second filter path output signal; and
      a controller configured to:
        determine whether the RF signal comprises a predefined interference signal based on a measured power level of the predefined interference signal;
        couple the RF signal to the first filter path input of the interference rejection filter path if the measured power level of the predefined interference signal is higher than a predefined power threshold; and
        couple the RF signal to the second filter path input of the pass filter path if the measured power level of the predefined interference signal is lower than or equal to the predefined power threshold; and
    a power measurement circuit comprising a power detector, the power detector configured to:
      determine the measured power level of the predefined interference signal in the RF signal; and
      provide the measured power level of the predefined interference signal to the controller.

2. The WDS of claim 1, wherein each remote unit among the plurality of remote units is configured to communicate the first filter path output signal as an uplink communications signal among the plurality of uplink communications signals if the measured power level of the predefined interference signal is higher than the predefined power threshold.

3. The WDS of claim 2, wherein each remote unit among the plurality of remote units is configured to communicate the second filter path output signal as an uplink communications signal among the plurality of uplink communications signals if the measured power level of the predefined interference signal is less than or equal to the predefined power threshold.

4. The WDS of claim 2, wherein:
  the central unit comprises an electrical-to-optical (E/O) converter configured to provide the plurality of downlink communications signals as a plurality of optical downlink communications signals, respectively; and the plurality of remote units comprises a plurality of remote unit optical-to-electrical (O/E) converters configured to receive the plurality of optical downlink communications signals, respectively.

5. The WDS of claim 4, wherein:
the plurality of remote units comprises a plurality of remote unit electrical-to-optical (E/O) converters configured to provide the plurality of uplink communications signals as a plurality of optical uplink communications signals, respectively; and
the central unit comprises an optical-to-electrical (O/E) converter configured to receive the plurality of optical uplink communications signals, respectively.

6. The WDS of claim 1, wherein each remote unit among the plurality of remote units is configured to communicate the second filter path output signal as an uplink communications signal among the plurality of uplink communications signals if the measured power level of the predefined interference signal is less than or equal to the predefined power threshold.

7. The WDS of claim 6, wherein:
the central unit comprises an electrical-to-optical (E/O) converter configured to provide the plurality of downlink communications signals as a plurality of optical downlink communications signals, respectively; and
the plurality of remote units comprises a plurality of remote unit optical-to-electrical (O/E) converters configured to receive the plurality of optical downlink communications signals, respectively.

8. The WDS of claim 7, wherein:
the plurality of remote units comprises a plurality of remote unit electrical-to-optical (E/O) converters configured to provide the plurality of uplink communications signals as a plurality of optical uplink communications signals, respectively; and
the central unit comprises an optical-to-electrical (O/E) converter configured to receive the plurality of optical uplink communications signals, respectively.

9. The WDS of claim 1, wherein the plurality of remote units comprises:
a plurality of remote unit optical-to-electrical (O/E) converters configured to receive the plurality of downlink communications signals, respectively;
a plurality of remote unit electrical-to-optical (E/O) converters configured to provide the plurality of uplink communications signals as a plurality of optical uplink communications signals, respectively.

10. The WDS of claim 9, wherein each remote unit comprises at least one radio transceiver, and wherein each remote unit is configured to communicate with client devices within range of the remote unit.

11. The WDS of claim 1, wherein each remote unit comprises at least one radio transceiver, and wherein each remote unit is configured to communicate with client devices within range of the remote unit.

12. A wireless distribution system (WDS), comprising:
a plurality of optical communications mediums; and
a plurality of remote units comprising a plurality of electrical-to-optical (E/O) converters and coupled to the plurality of optical communications mediums, the plurality of remote units configured to:
receive the plurality of downlink communications signals via the plurality of optical communications mediums; and
communicate the plurality of uplink communications signals via the plurality of optical communications mediums;

wherein each of the plurality of remote units comprises a filter path selection system that comprises:
a filter path selection circuit, comprising:
an interference rejection filter path comprising a first radio frequency (RF) filter, the first RF filter configured to:
receive an RF signal from a first filter path input provided in the interference rejection filter path and communicatively coupled to one or more client devices in the WDS; and
filter the received RF signal at a first rejection level to generate a first filter path output signal;
a pass filter path comprising a second RF filter, the second RF filter configured to:
receive the RF signal from a second filter path input provided in the pass filter path and communicatively coupled to the one or more client devices; and
filter the received RF signal at a second rejection level lower than the first rejection level to generate a second filter path output signal; and
a controller configured to:
determine whether the RF signal comprises a predefined interference signal based on a measured power level of the predefined interference signal;
couple the RF signal to the first filter path input of the interference rejection filter path if the measured power level of the predefined interference signal is higher than a predefined power threshold; and
couple the RF signal to the second filter path input of the pass filter path if the measured power level of the predefined interference signal is lower than or equal to the predefined power threshold; and
a power measurement circuit comprising a power detector, the power detector configured to:
determine the measured power level of the predefined interference signal in the RF signal; and
provide the measured power level of the predefined interference signal to the controller.

13. The WDS of claim 12, wherein each remote unit among the plurality of remote units is configured to communicate the first filter path output signal as an uplink communications signal among the plurality of uplink communications signals if the measured power level of the predefined interference signal is higher than the predefined power threshold.

14. The WDS of claim 13, wherein each remote unit among the plurality of remote units is configured to communicate the second filter path output signal as an uplink communications signal among the plurality of uplink communications signals if the measured power level of the predefined interference signal is less than or equal to the predefined power threshold.

15. The WDS of claim 12, wherein each remote unit among the plurality of remote units is configured to communicate the second filter path output signal as an uplink communications signal among the plurality of uplink communications signals if the measured power level of the predefined interference signal is less than or equal to the predefined power threshold.

16. The WDS of claim 15, wherein each remote unit comprises at least one radio transceiver, and wherein each remote unit is configured to communicate with client devices within range of the remote unit.

17. The WDS of claim 12, wherein each remote unit comprises at least one radio transceiver, and wherein each remote unit is configured to communicate with client devices within range of the remote unit.

\* \* \* \* \*